(12) United States Patent
Kusase et al.

(10) Patent No.: US 6,922,000 B2
(45) Date of Patent: Jul. 26, 2005

(54) ROTARY ELECTRIC MACHINE (75) Inventors: Shin Kusase, Obu (JP); Takuzou Mukai, Handa (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/829,166

(22) Filed: Apr. 22, 2004

(65) Prior Publication Data
US 2004/0195925 A1 Oct. 7, 2004

Related U.S. Application Data (62) Division of application No. 10/390,906, filed on Mar. 19, 2003, now Pat. No. 6,794,790.

(30) Foreign Application Priority Data

Mar. 20, 2002 (JP) .......................................... 2002-77774
Apr. 19, 2002 (JP) ......................................... 2002-117775

(51) Int. Cl.[7] .......................... H02K 21/10; H02K 1/27
(52) U.S. Cl. ..................... 310/156.53; 310/266; 322/50
(58) Field of Search ................................ 310/261, 266, 310/166, 168–170, 210–213, 156.48, 156.49, 156.53, 156.55, 156.56

(56) References Cited

U.S. PATENT DOCUMENTS

| | | | |
|---|---|---|---|
| 2,802,959 A | 8/1957 | Powers | |
| 3,319,100 A | 5/1967 | Erickson | |
| 3,555,327 A | 1/1971 | Terry | |
| 3,571,690 A | 3/1971 | Apsit | |
| 3,599,024 A | 8/1971 | Kitamura | |
| 3,663,846 A | 5/1972 | Wagner et al. | |
| 5,345,133 A | * 9/1994 | Satake | 310/266 |
| 5,744,895 A | * 4/1998 | Seguchi et al. | 310/266 |
| 5,751,089 A | * 5/1998 | Stridsberg | 310/266 |
| 5,773,910 A | * 6/1998 | Lange | 310/266 |
| 5,783,893 A | * 7/1998 | Dade et al. | 310/266 |
| 6,093,992 A | * 7/2000 | Akemakou | 310/156.55 |
| 6,097,124 A | * 8/2000 | Rao et al. | 310/156.26 |

FOREIGN PATENT DOCUMENTS

| | | |
|---|---|---|
| JP | A 52-36710 | 3/1977 |
| JP | A 7-336972 | 12/1995 |

* cited by examiner

Primary Examiner—Burton Mullins
(74) Attorney, Agent, or Firm—Oliff & Berridge, PLC

(57) ABSTRACT

A rotary electric machine is composed of an armature core, an armature winding, a rotor core disposed opposite said armature core, a rotary magnetic-flux source for supplying first magnetic flux to the rotor core, a frame for supporting the armature core and the rotor core and a stationary magnetic flux source, fixed to the frame, for supplying second magnetic flux to the rotor core in a direction to supplement the first magnetic flux.

8 Claims, 7 Drawing Sheets

ROTARY ELECTRIC MACHINE

This is a Divisional of application Ser. No. 10/390,906 filed Mar. 19, 2003, now issued as U.S. Pat. No. 6,794,790. The entire disclosure of the prior application is hereby incorporated by reference herein in its entirety.

CROSS REFERENCE TO RELATED APPLICATION

The present application is based on and claims priority from the following Japanese Patent Applications: 2002-77774, filed Mar. 20, 2002 and 2002-117775 filed Apr. 19, 2002, the contents of which are incorporated herein by reference.

BACKGROUND OF THE INVENTION

1. Field of the Invention

The present invention relates to a compact and powerful rotary electric machine to be used for a passenger car, an airplane and an electric power tool.

2. Description of the Related Art

A typical rotary electric machine to be used for a vehicle is an alternator that has a Lundell type rotary magnetic core. The Lundell type rotary magnetic core is composed of a boss portion, a pair of disk portions disposed at opposite ends of the boss portion and a plurality of claw poles extending from the disk portions in the axial direction of the core to alternately interleave with each other. A cylindrical field coil is wound around the boss portion to supply magnetic flux to parallel magnetic circuits that respectively include the claw poles. Therefore, comparatively large magnetomotive force can be applied to the claw poles, so that the alternator can generate comparatively high power.

However, the thickness of the claw poles have to be limited in order to limit the outside diameter of the alternator. This limitation may cause DC magnetic saturation, which limits an amount of effective magnetic flux and output power of the alternator.

In order to increase the effective magnetic flux, it has been proposed that a permanent magnet is inserted between adjacent claw poles. However, the space for accommodating the permanent magnets is limited and cooling performance of the alternator may get worse because the permanent magnets close air passages.

SUMMARY OF THE INVENTION

Therefore, a main object of the invention is to provide a more compact and powerful rotary electric machine.

According to a feature of the invention, a rotary electric machine includes an armature core and an armature winding mounted in the armature core, a rotor having a rotor core, a rotary magnetic-flux source fixed to the rotor core, a frame and a stationary magnetic flux source fixed to the frame. The stationary magnetic flux is supplied to the rotor core in a direction to supplement the first magnetic flux. Therefore, effective magnetic flux supplied to the armature core can be increased without increasing the size of the rotor. Because the stationary magnetic source can be disposed in a dead space of the front frame, the frame does not increase the size. The second magnetic flux source may include a yoke for magnetically connecting the armature core and the rotor core and a stationary field coil for providing dc magnetomotive force in a direction opposite the polarity of the rotor core. The rotary or stationary magnetic flux source may be composed of a permanent magnet. In such a case, the other includes a field coil. The field current supplied to the field coil is controlled to change magnetic flux supplied to the armature core.

Another object of the invention is to provide an electric rotary machine whose rotor has a reduced moment of inertia in order to rotate as soon as it is started.

According to another feature of the invention, a rotary electric machine includes a stator core, a three-phase armature winding and a field coil, an inductor rotor disposed opposite the stator core via a first air gap and a magnetic circuit means for connecting the rotor, the stator core via a second air gap. The inductor rotor is composed of a plurality of magnetically conductive portions and magnetically non-conductive portions that are alternately disposed in the circumferential direction thereof between the first air gap and the second air gap.

Because the inductor does not include a cylindrical field coil or claw poles, the moment of inertia thereof is very small as compared to the rotor having a Lundell type pole cores. When the motor-generator is operated as a motor, the inductor can rotates in a very short time after armature current is supplied by the inverter because of the small moment of inertia of the inductor.

The inductor rotor may include a plurality of permanent magnets having the same polarity disposed in the circumferential direction thereof at two magnetic pole-pitches. The field coil may be disposed inside the inductor rotor.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
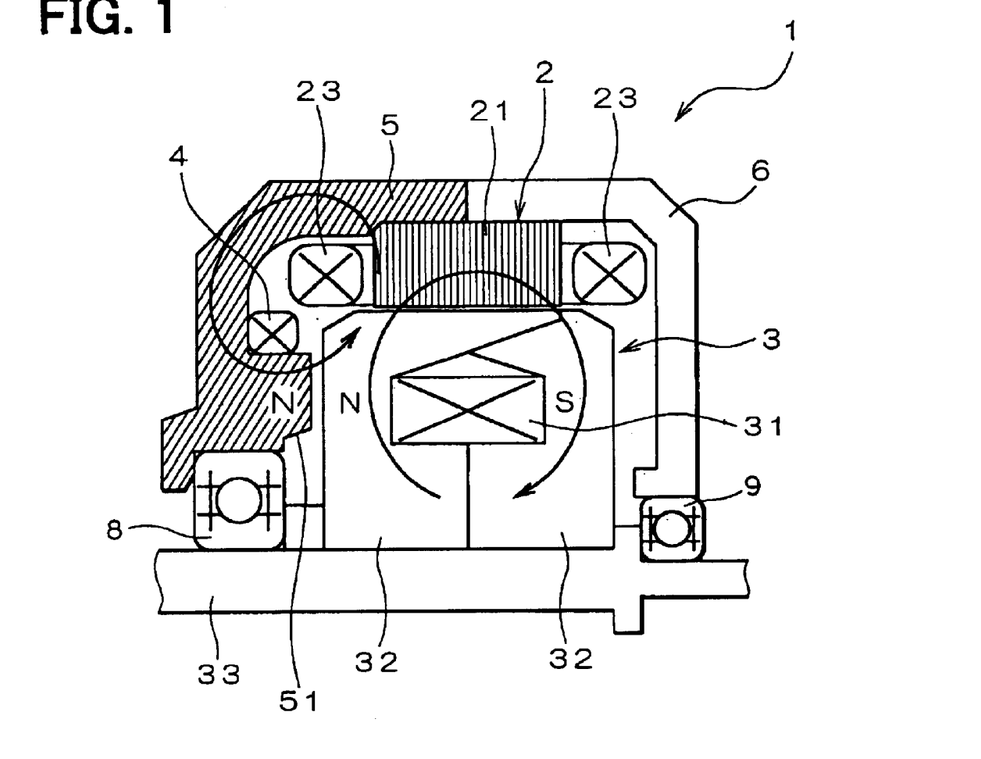
FIG. 1 is a schematic cross-sectional diagram of a main portion of an ac generator for a vehicle according to the first embodiment of the invention.
Figure 2:
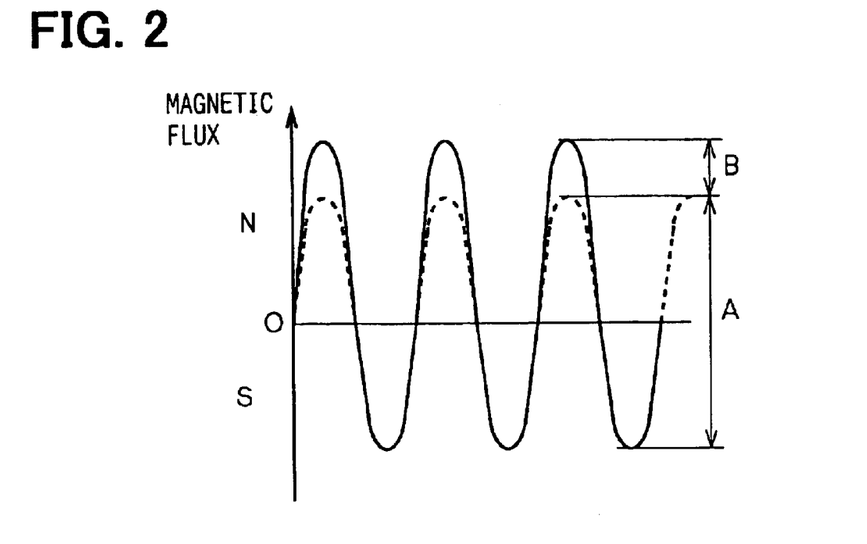
FIG. 2 is a graph showing two magnetic flux waves generated in the ac generator.
Figure 3:
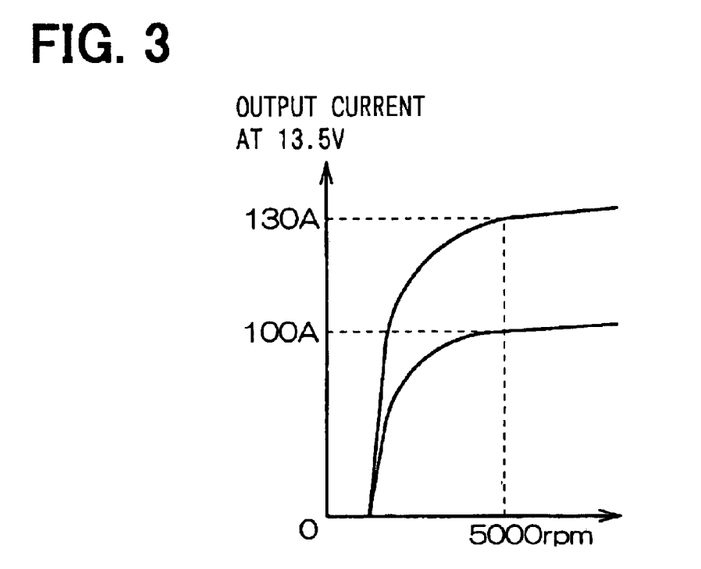
FIG. 3 is a graph showing a power characteristic of the ac generator.

An ac generator for a vehicle according to the first embodiment of the invention will be described with reference to FIGS. 1–3.

The ac generator 1 is composed of an armature 2, a rotor 3, a cylindrical stationary field coil 4, a front frame 5, a rear frame 6, a front bearing 8, and a rear bearing 9 etc.

The armature 2 is composed of an armature core 21, a three-phase armature winding 23 that is mounted in a plurality of slots formed in the armature core 21. The armature winding 23 has output lead wires connected to a three-phase full-wave rectifier unit (not shown), which provides DC output power.

The rotor 3 is composed of a cylindrical rotary field coil 31, a pair of Lundell type magnetic pole cores 32 each of which has six claw poles extending to enclose the rotary field coil 31 and a rotary shaft 33. Field current is supplied to the rotary field coil 31 via a pair of brushes and a pair of slip rings (which are not shown but well known).

The front frame 5 and the rear frame 6 accommodate the armature 2 and the rotor 3 so that the rotor 3 and the rotary shaft 33 can rotate inside the armature 2 and so that the peripheral surfaces of the claw poles can face the inside surface of the armature core 21 through a first air gap. The front frame 5 is made of soft iron and has a stationary magnetic pole 51 at a portion that faces an axial end of one of the pole cores 32 through a second air gap. Thus, the front frame 5 functions as a magnetic yoke that magnetically connects the armature core 21 and the pole cores 32. On the other hand, the rear frame 6 is made of aluminum or other non-magnetic material.

The stationary field coil 4 is disposed inside the front frame 5 and fixed to a radially outer surface of the stationary magnetic pole 51. The stationary field coil 4 supplies magnetic flux to the armature 2 through a magnetic circuit in parallel with a magnetic circuit of the rotary field coil 31. When field current is supplied to the rotary field coil 31, the pole core 32 on the side of front frame 5 is polarized to be magnetic N-pole, and the pole core 32 on the other side is polarized to be S-pole. Accordingly, alternating magnetic flux A is supplied to the armature core 21 when the rotor rotates. When field current is supplied to the stationary field coil 4, the stationary pole 51 is polarized to be N-pole. Accordingly, one way magnetic flux B is supplied from the stationary magnetic pole 51 to the armature core 21 as long as the field current is supplied to the stationary field coil 4. When field current is supplied to both the rotary field coil 31 and the stationary field coils 4, the armature core 21 is supplied with magnetic flux A and magnetic flux B, as shown in FIG. 2. In other words, the magnetic flux supplied from the claw poles of the magnetic pole core 32 on the side of the front frame 5 is larger than the magnetic flux from the claw poles on the other side.

Therefore, effective magnetic flux supplied to the armature winding 23 is increased by the stationary field coil 4 and the stationary magnetic pole 51, which can be disposed in a dead space of the front frame. As a result, the output power can be increased by approximately 30%, as shown in FIG. 3, without increasing the size of the generator.

In the above embodiment, the stationary field coil 4 can be disposed inside the rear frame instead of the front frame, or another stationary field coil can be added to the rear frame 6. In this case, the rear frame 6 is preferably made of soft iron.

An ac generator 1A according to the second embodiment of the invention will be described with reference to FIGS. 4–5.

The rotary field coil 31 of the ac generator 1 according to the first embodiment is replaced by a disk-shaped permanent magnet 131. Therefore, the ac generator 1A is composed of an armature 2, a rotor 3A, a first stationary field coil 4A, a second stationary coil 4B, a front frame 5A, a rear frame 5A, and yokes 71, 72, 73, 74.

The armature 2, which is the same in structure as the ac generator according to the first embodiment, has an armature core 21 and an armature winding 23. The rotor 3A has a pair of magnetic pole cores 132 each of which has six claw poles enclosing the disk-shaped permanent magnet 131 and a rotary shaft 133. The front frame 5A and the rear frame 6A are made of aluminum and accommodate the armature 2 and the rotor 3A therein in the same manner as the first embodiment.

The yoke 71 is an L-shaped member made of soft iron having one side fixed to the inner surface of the front frame 5A and the other side extending in the axial direction of the frame 5A. The yoke 72 is fixed to the yoke 71 so as to hold the first stationary field coil 4A together with the yoke 71. The yoke 72 is disposed opposite the pole core 132 on the side of the front frame 5A so as to function as a stationary pole core that is polarized to have the same magnetic pole as this pole core 132.

The yoke 73 is an L-shaped member made of soft iron having one side fixed to the inner surface of the rear frame 5B and the other side extending in the axial direction. The yoke 74 is fixed to the yoke 73 so as to hold the second stationary field coil 4B together with the yoke 73. The yoke 74 is disposed opposite the pole core 132 on the side of the rear frame 6A so as to function as a stationary pole core that is polarized to have the same magnetic pole as this pole core 132.

A magnetic circuit through which the magnetic flux of the first stationary field coil 4A flows is formed in parallel with a magnetic circuit through which the magnetic flux of the permanent magnet flows. As shown in FIG. 4, the pole core 132 on the side of the front frame SA is polarized by the permanent magnet 131 to be N-pole, and the yoke 72 is polarized to be N-pole when the first stationary field coil 4A is supplied with field current. On the other hand, the pole core 132 on the side of the rear frame 6A is polarized by the permanent magnet 131 to be S-pole, and the yoke 74 is polarized to be S-pole when the second stationary field coil 4B is supplied with field current. Thus, the effective magnetic flux supplied to the armature winding 23 can be increased.

When no field current is supplied to the first and second stationary field coils 4A, 4B, the flux of the permanent magnet 131 flows through the pole core 132 on the side of the front frame, the yoke 72, the yoke 71, the armature core 21, the yoke 73, the yoke 74 and the pole core 132 on the side of the rear frame. Therefore, no magnetic flux cross the armature winding. As a result, no power is generated when no current is supplied to the stationary coils although the ac generator has a permanent magnet.

On the other hand the output power can be easily controlled by changing the field current supplied to the stationary field coils 4A, 4B. In this embodiment, the front and rear frames can be made of soft iron so that the yokes can be integrated therewith.

An ac generator 1B according to the third embodiment of the invention will be described with reference to FIGS. 6 and 7.

Figure 6:
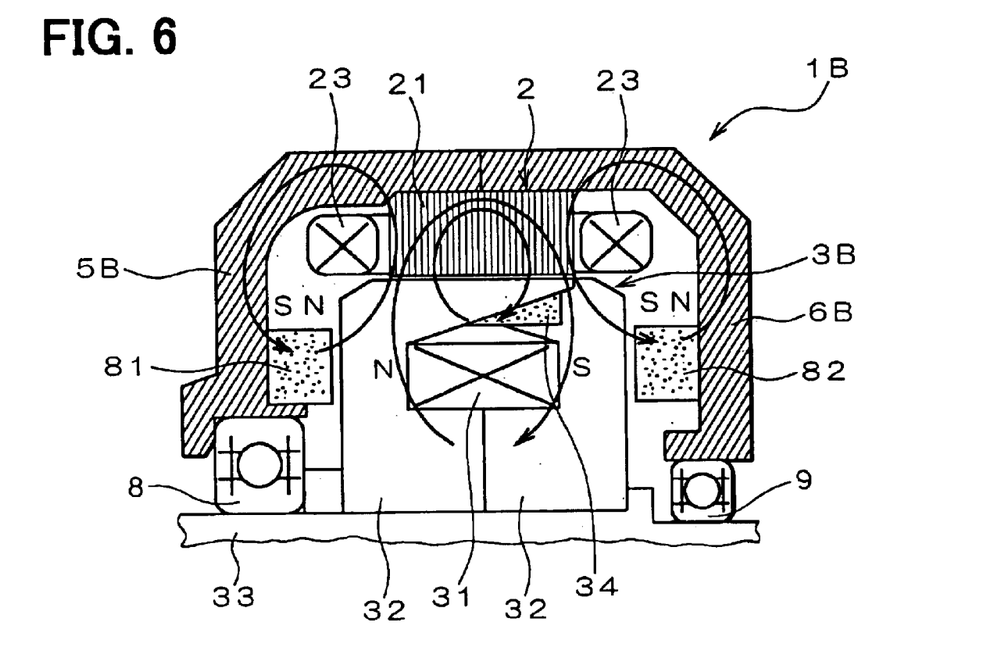
FIG. 6 is a schematic cross-sectional diagram of a main portion of an ac generator for a vehicle according to the third embodiment of the invention.
Figure 7:
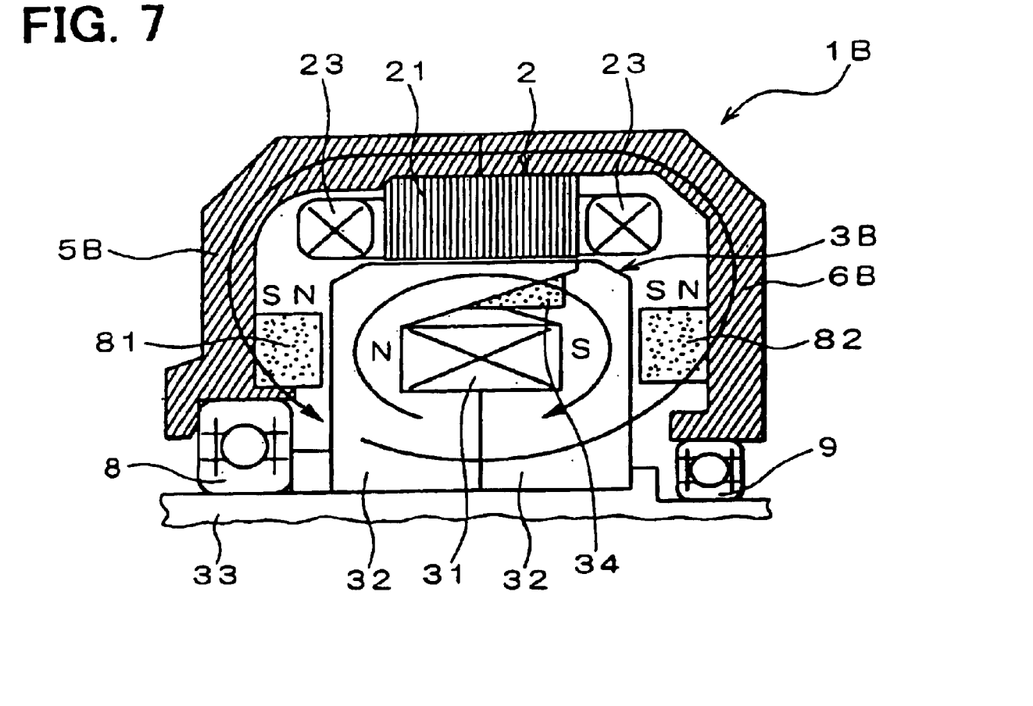
FIG. 7 is a schematic cross-sectional diagram of a main portion of an ac generator for a vehicle according to the third embodiment of the invention.

As shown in FIG. 6, the ac generator for a vehicle is composed of an armature 2, a rotor 3B, a front frame 5B, a rear frame 6B, a first stationary permanent magnet 81 and a second stationary permanent magnet 82. The armature 2, which is basically the same as the armature of the ac generator according to the first embodiment, is composed of an armature core 21 and an armature winding 23. The rotor 3B has permanent magnets 34 between adjacent claw poles in addition to the components of the rotor 3 of the ac generator according to the first embodiment. The front frame 5B and the rear frame 6B are made of soft iron so as to function as a magnetic yoke and accommodate the armature 2 and the rotor 3B in the same manner as the previously described ac generators.

The first stationary permanent magnet 81 is disposed at a portion of the inside wall of the front frame 5B opposite the front surface of the pole core 32 that is disposed on the front end of the rotor 3B. The permanent magnet 81 is magnetized so that rear surface of the permanent magnet 81 has the same polarity as the front surface of the said pole core 32. The second stationary permanent magnet 82 is disposed at a portion of the inside wall of the rear frame 6B opposite the rear surface of the pole core 32 that is disposed on the rear end of the rotor 3B. The permanent magnet 82 is magnetized so that front surface of the permanent magnet 82 has the same polarity as the rear surface of the said pole core 32.

Thus, the magnetic flux of the permanent magnets 81, 82 can be added to the magnetic flux of the rotary field coil 31 so that the output power of the ac generator can be increased.

When no field current is supplied to the rotary field coil 31, the composite magnetic flux of the permanent magnets 81, 82 flows from the permanent magnet 81 through the pole core 32 on the side of the front frame, the pole core 32 on the side of the rear frame, the permanent magnet 82, the rear frame 6B and the front frame 5B to the permanent magnet 81. In addition, the magnetic flux of the permanent magnet 34 flows through the pole core on the side of the front frame 32, the pole core on the side of the front frame 32 to the permanent magnet 34. Therefore, no magnetic flux cross the armature winding. As a result, no power is generated when no current is supplied to the stationary coils although the ac generator has a permanent magnet.

Figure 4:
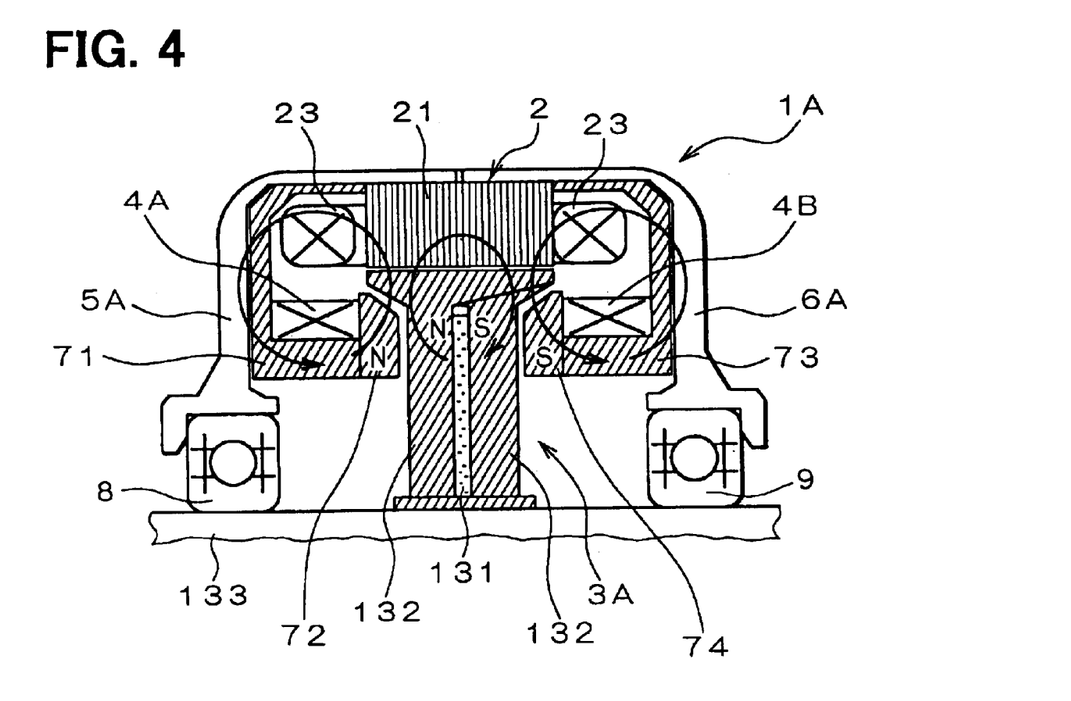
FIG. 4 is a schematic cross-sectional diagram of a main portion of an ac generator for a vehicle according to the second embodiment of the invention.
Figure 5:
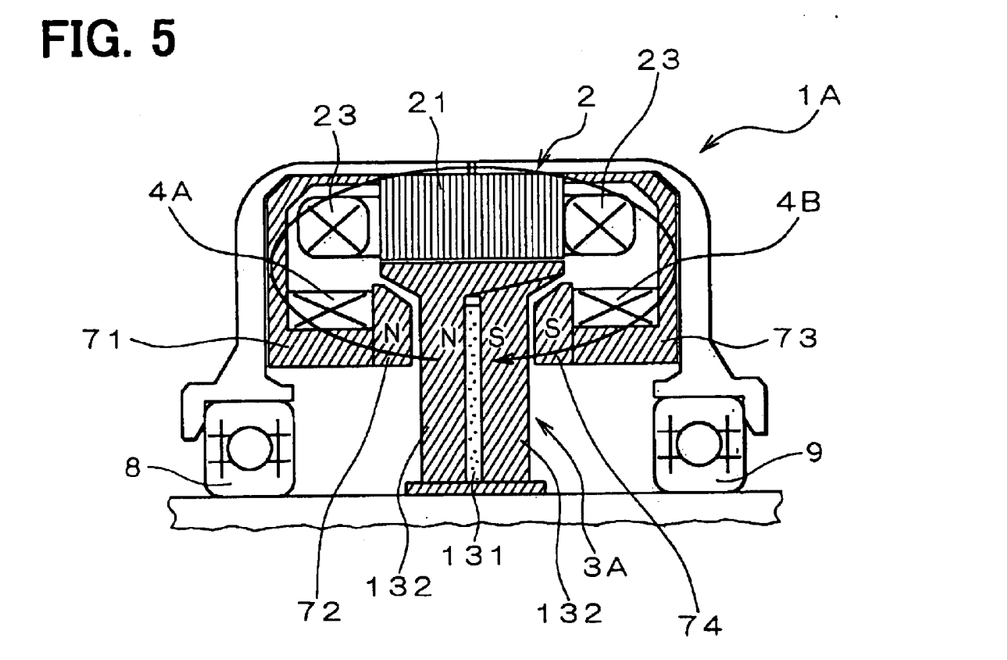
FIG. 5 is a schematic cross-sectional diagram of a main portion of an ac generator for a vehicle according to the second embodiment.

In this embodiment, the front and rear frame can be made of non-magnetic material if the portions of the magnetic circuit of the frames are replaced by yokes as shown in FIG. 4.

Figure 8:
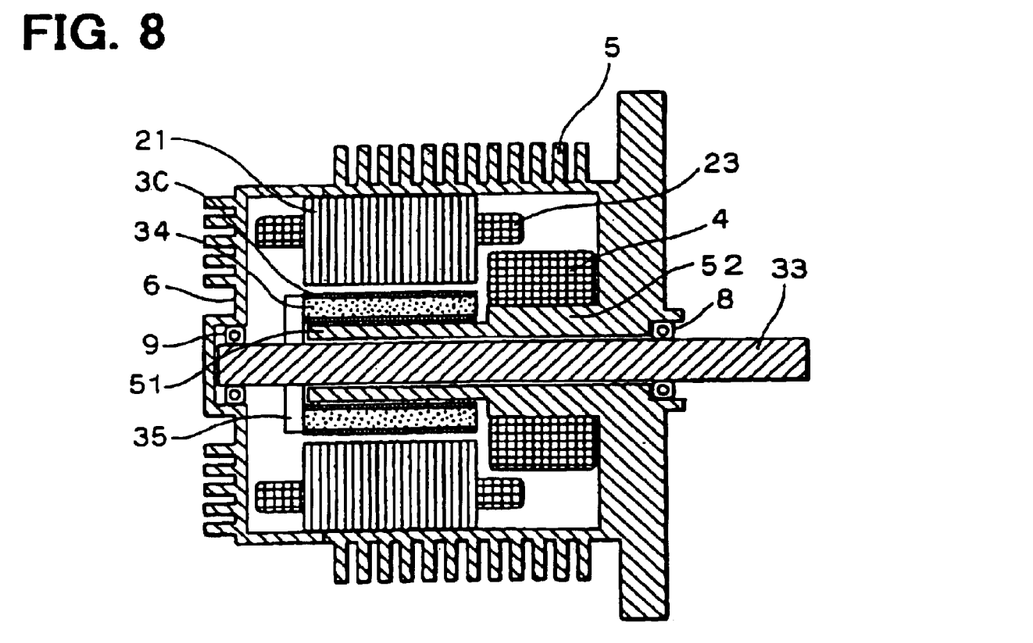
FIG. 8 is a cross-sectional side view of an ac generator according to the fourth embodiment of the invention.

An ac generator for a vehicle according to the fourth embodiment of the invention will be described hereafter with reference to FIGS. 8–10.

The ac generator includes a front frame 5 made of cast iron, a three-phase armature winding 23, a cylindrical stator core 21 in which the stator winding 23 is mounted, a cylindrical inductor 3C made of laminated iron sheets disposed inside the stator core 21, a non-magnetic retainer plate 35, a rotary shaft 33, a rear frame 6 made of non-magnetic material, a front bearing 8, a rear bearing 9, a cylindrical field coil 4 and a plurality of permanent magnets 34. The non-magnetic retainer plate 35 is disposed at an end of the inductor 3C to fix the inductor 3C and the rotary shaft 33 together. The front frame 5 and the rear frame 6 are coupled together to hold the stator core 21. The inductor 3C and the shaft 33 are rotatably supported by the front and rear bearings 8, 9. The front frame 5 has a cylindrical core portion that axially projects into the inside of the inductor 3C. The cylindrical core portion has an inner bore through which the rotary shaft 33 extends so as to freely rotate. The cylindrical core portion also has an end portion 51 having a smaller outside diameter around which the inductor 3C is disposed and a base portion 52 having a larger outside diameter around which the field coil 4 is wound.

Figure 9:
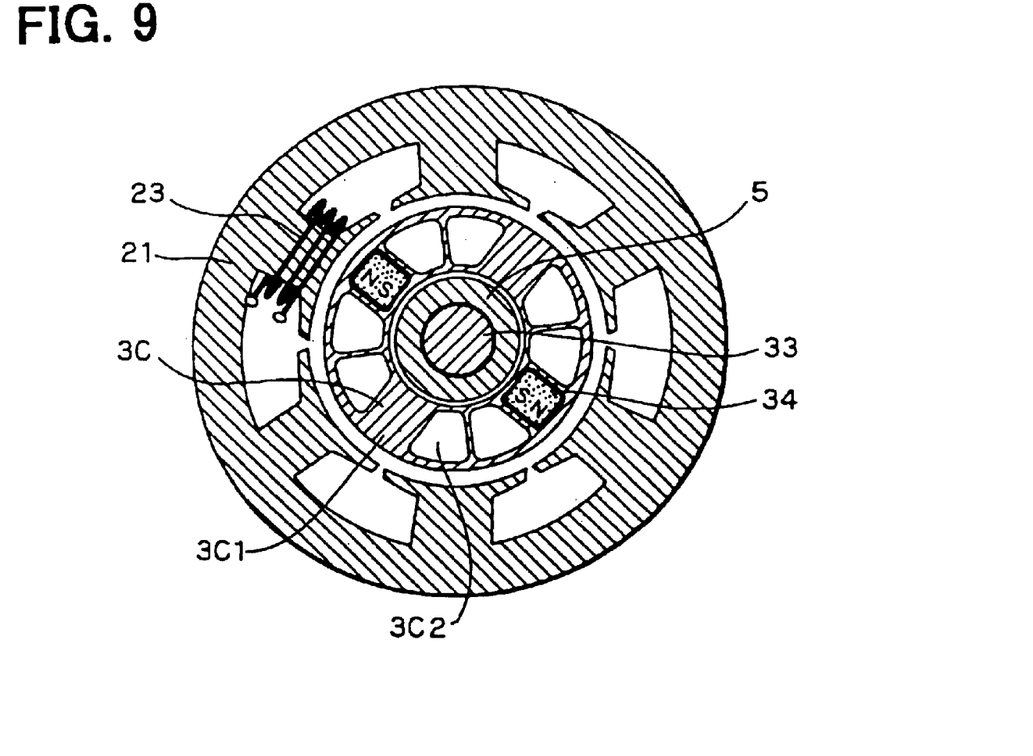
FIG. 9 is a cross-sectional plan view of the ac generator according to the fourth embodiment.
Figure 10:
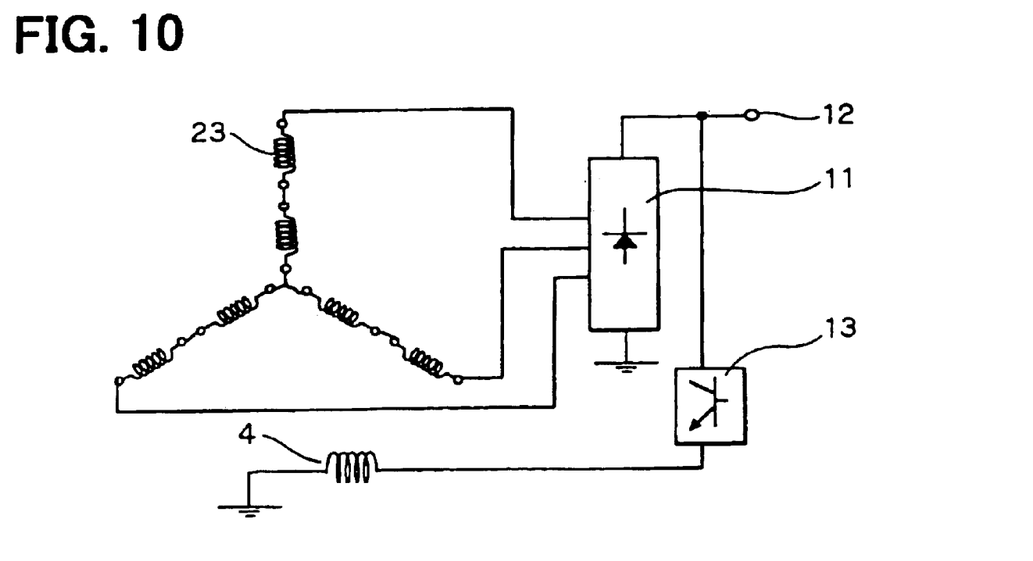
FIG. 10 is a circuit diagram of the ac generator according to the fourth embodiment.

The stator core 21 has six teeth around which the armature winding 23 is wound, as shown in FIG. 9. The armature winding 23 has three output ends that are connected to a rectifier unit 11 to provide dc output power at an output terminal 12, as shown in FIG. 10. A field-current control unit 13 is connected to the field coil 4.

The inductor 3C is composed of a outer ring, an inner ring and a plurality of honeycomb shaped slots between the outer and inner rings. Two rings are magnetically connected by a pair of diametrically formed thick spoke members. The outer ring is so thin that no magnetic circuit can be formed thereby. The inner ring forms a portion of a magnetic circuit. The permanent magnets 34 are disposed at two pole-pitches in the circumferential direction of the inductor 3C. Thus, the inductor 3C has magnetically conductive portions 3C1 and magnetically non-conductive portions 3C2.

The rotary shaft 33 carries a pulley, which is rotated by an engine via a belt.

When the rotary shaft 33 is driven by an engine via a pulley, the inductor 3C is rotated by the shaft 33 via the retainer plate 35. When field current is supplied to the field coil 4 by the field current control unit 13, the field coil 4 generates magnetic flux flowing from the field coil 4 through the front frame 5, the stator core 21, the inductor 3C to the cylindrical core portion of the front frame 5. When the inductor 3C rotates, magnetic flux flowing through the inductor 3C changes because of the magnetically conductive portions and the magnetically non-conductive portions of the inductor 3C. Accordingly, ac voltage is induced in the armature winding 23. Because the permanent magnets 34 are disposed at two pole pitches and magnetized to have a polarity opposite the direction of the magnetomotive force of the stator core 21, the amplitude of change in the magnetic flux that crosses the armature winding is increased by the permanent magnets. The ac voltage is converted into dc voltage by the rectifier unit 11.

Thus, the outside diameter of the inductor 3C can be made very small as compared by a rotor having a Lundell type pole cores because the inductor 3C does not include a cylindrical field coil or claw poles. Because the inductor 3C is made of laminated iron sheets that have hollow slots, the moment of inertia thereof is very small as compared to the rotor having a Lundell type pole cores.

For example, the moment of inertia is compared between a rotor that has a Lundell type pole cores of an ac generator whose rated power is 100 A and an inductor of an ac generator according to the invention whose rated power is approximately the same. The rotor, which has a Lundell type pole cores, has about 28 kg-cm$^2$, while the inductor has about 7 kg-m$^2$. Thus, the moment of inertia of the inductor 3C is about one fourth of that of the rotor having a Lundell type pole cores.

Figure 11:
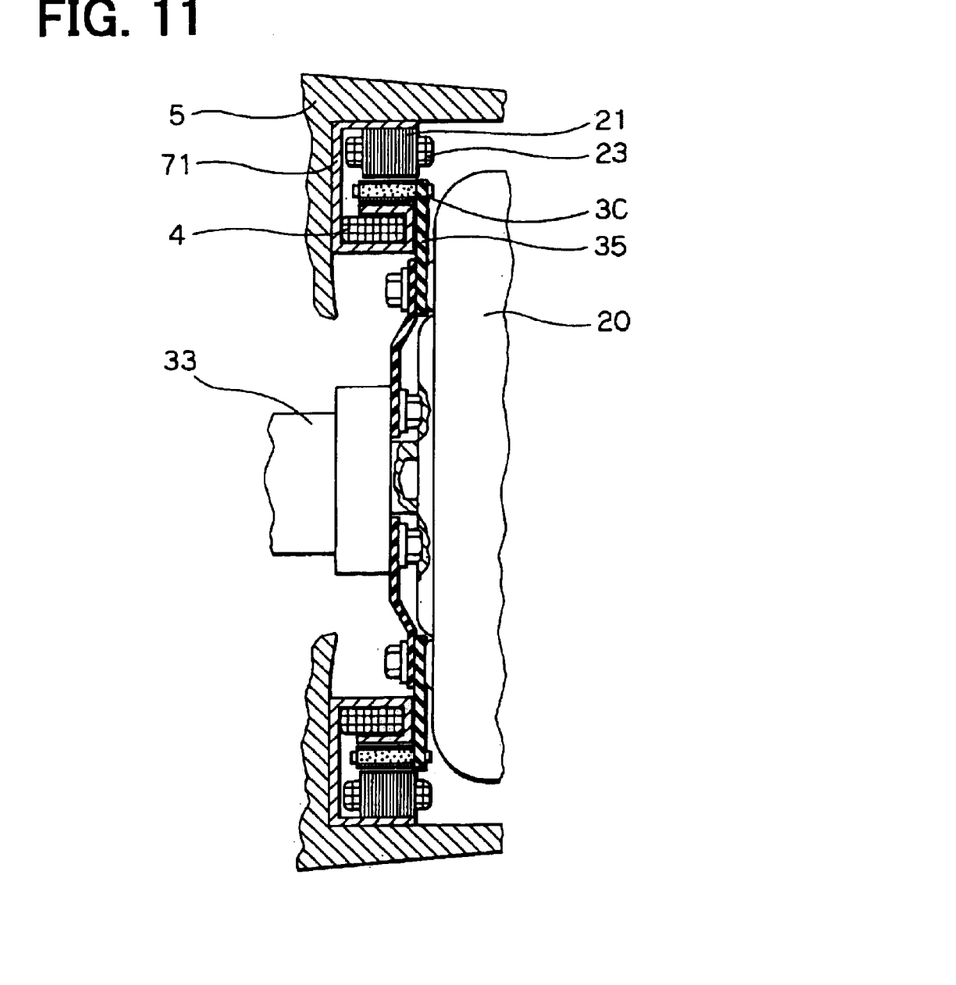
FIG. 11 is a cross-sectional side view of a motor generator according to the fifth embodiment of the invention.
Figure 12:
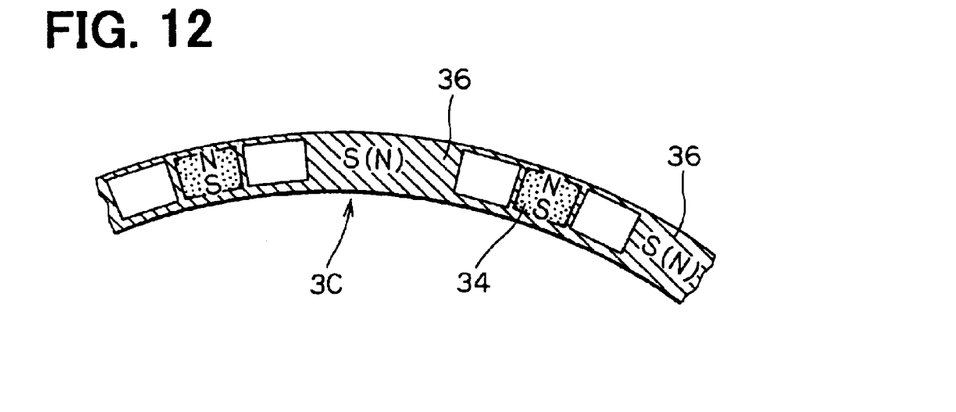
FIG. 12 is a cross-sectional plan view of a main portion of the motor generator according to the fifth embodiment.
Figure 13:
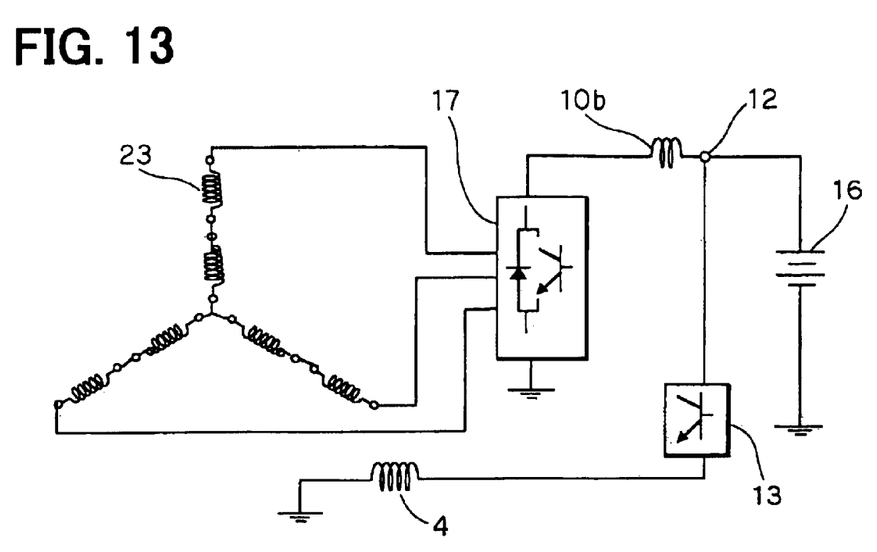
FIG. 13 is a circuit diagram of the motor generator according to the fifth embodiment.

A motor generator according to the fifth embodiment of the invention is described with reference to FIGS. 11–13.

The motor generator includes a cylindrical stator core 21 in which a stator winding 23 is mounted, a cylindrical inductor 3C made of laminated iron sheets disposed inside the stator core 21, a non-magnetic retainer plate 35, a cylindrical field coil 4 and a plurality of permanent magnets 34, a frame 5, a yoke 71 and a rotary shaft 33. The non-magnetic retainer plate 35 is disposed at an end of the inductor 3C to fix the inductor 3C and the rotary shaft 24 together. The frame 5 and the yoke 22 hold the stator core 21. The stator core 21 has a plurality of teeth around which the armature winding 23 is wound. The armature winding 23 has three output ends that are connected to an inverter unit 17. The armature winding 23 and the field coil 4 are connected in series so that starting torque can be increased. A field-current control unit 13 is connected to the field coil 4.

The inductor 3C is composed of an outer ring, an inner ring and a plurality of rectangular slots between the outer and inner rings. Two rings are magnetically connected by a plurality of spoke members 36. The outer ring is so thin that no magnetic circuit can be formed thereby. The inner ring has a thickness of about ⅙ of the distance between the outer ring and the inner ring and forms a portion of a magnetic circuit. The permanent magnets 34 are disposed at two pole-pitches in the circumferential direction of the inductor 3C. Thus, the inductor 3C has magnetically conductive portions and magnetically non-conductive portions. The rotary shaft 24 is connected to an engine 20 directly.

When the rotary shaft 24 is driven by an engine, the inductor 3C is rotated by the shaft 24 via the retainer plate 35. When field current is supplied to the field coil 4 by the field current control unit 13, the field coil 4 generates magnetic flux flowing from the field coil 4 through the yoke 22, the stator core 21, the inductor 3C to the field coil 4. When the inductor 3C rotates, magnetic flux flowing through the inductor 3C changes because of the magnetically conductive portions and the magnetically non-conductive portions of the inductor 3C. Accordingly, ac voltage is induced in the armature winding 23. Because the permanent magnets 34 are disposed at two pole pitches and magnetized to have a polarity opposite the direction of the magnetomotive force of the stator core 21, the amplitude of change in the magnetic flux that crosses the armature winding is increased by the permanent magnets 34. The ac voltage is converted into dc voltage by the inverter unit 17. Because the inductor 3C does not include a cylindrical field coil or claw poles, the moment of inertia thereof is very small as compared to the rotor having a Lundell type pole cores. When the motor-generator is operated as a motor, the inductor can rotates in a very short time when armature current is supplied by the inverter 17 because of the small moment of inertia of the inductor 3C and series connection of the armature winding 23 and the field coil 4.

Figure 14:
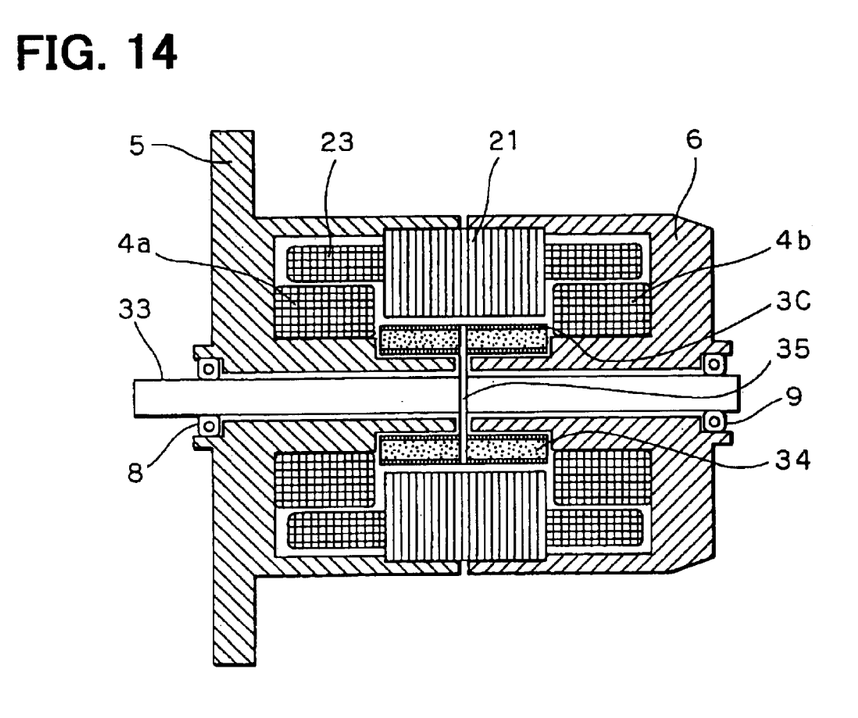
FIG. 14 is a cross-sectional side view of an ac generator for a vehicle according to the sixth embodiment of the invention.

An ac generator for a vehicle according to the sixth embodiment of the invention will be described hereafter with reference to FIG. 14.

The ac generator includes a cylindrical front field coil 4a, a cylindrical rear field coil 4b, a front frame 5 made of magnetic material, a rear frame 6 made of magnetic material, a front bearing 8, a rear bearing 9, a cylindrical stator core 21 in which a stator winding 23 is mounted, a cylindrical inductor 3C made of laminated iron sheets disposed inside the stator core 21, a non-magnetic retainer plate 35, a rotary shaft 33, and a plurality of permanent magnets 34 circumferentially disposed inside the inductor 3C. The non-magnetic retainer plate 35 is disposed at the axial middle of the inductor 3C to fix the inductor 3C and the rotary shaft 33 together. The front frame 5 and the rear frame 6 jointly hold the stator core 21. The inductor 3C and the shaft 33 are rotatably supported by the front and rear bearings 8, 9. The front frame 5 and the rear frame 6 respectively have a cylindrical core portion that axially projects into the inside of the inductor 3C. Each of the cylindrical core portions has an inner bore through which the rotary shaft 33 extends so as to freely rotate and an end portion having a smaller outside diameter and a base portion having a larger outside diameter. The inductor 3C is disposed around the end portions of the front and rear frames 1, 7, and the retainer plate 35 is disposed between the two end portions. The field coil 4a or 10b are respectively disposed around the base portions.

Other portions are substantially the same as those of the ac generator according to the fourth embodiment.

Thus, the outside diameter of the inductor 3C can be made very small as compared by a rotor having a Lundell type pole cores, so that the moment of inertia thereof can be made very small.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A rotary electric machine comprising:
   a stator core having a three-phase armature winding;
   an inductor rotor disposed opposite said stator core via a first air gap;
   a field coil; and
   a magnetic circuit means for magnetically coupling said rotor with said stator core via a second air gap, wherein:
   said inductor rotor comprises a plurality of magnetically conductive portions, a plurality of permanent magnets and magnetically non-conductive portions that are parallelly disposed in the circumferential direction thereof between said first air gap and said second air gap so as to change magnetic flux flowing through said inductor when said inductor rotates; and
   said plurality of permanent magnets is magnetized to increase magnetic flux flowing through said inductor; and
   said magnetic circuit means comprises a cylindrical portion around which said inductor rotor is disposed and a base portion around which said field coil is wound and said cylindrical portion and said base portion are contiguous.

2. The rotary electric machine as claimed in claim 1, wherein said plurality of permanent magnets is disposed in the circumferential direction of said inductor rotor at two magnetic pole-pitches.

3. The rotary electric machine as claimed in claim 1, further comprising a rectifier unit connected to said armature winding for providing dc output power and a field current control unit connected to said field coil and said rectifier unit for supplying field current to said field coil.

4. A rotary electric machine comprising:
   a stator core having a plurality of teeth on which a three-phase armature winding is mounted;
   a generally cylindrical inductor rotor having a first peripheral surface disposed opposite said stator core via a first air gap and a second peripheral surface;
   a magnetic circuit means for magnetically exciting said stator core through said inductor rotor, said magnetic circuit means having a first portion disposed opposite the second peripheral surface of said inductor rotor via a second air gap and a second portion disposed between said first portion and said stator core around which a field coil is wound and said first portion and said second portion are contiguous; wherein:

said inductor rotor comprises a plurality of magnetically conductive portions disposed in the circumferential direction thereof to magnetically connect the teeth of said stator core and said first portion of said magnetic circuit means, a plurality of magnetically non-conductive portions and a plurality of permanent magnets magnetized to have a polarity opposite magnetic motive force of said stator core and disposed in parallel with the magnetically conductive portions.

5. The rotary electric machine as claimed in claim 4 further comprising a frame, wherein said magnetic circuit means is integrated with said frame.

6. The rotary electric machine as claimed in claim 5, wherein said frame is made of cast iron.

7. The rotary electric machine as claimed in claim 4 further comprising a rotary shaft, wherein said first and second portions of said magnetic circuit means have an inner bore through which said rotary shaft extends to freely rotate.

8. The rotary electric machine as claimed in claim 4, wherein said inductor rotor further comprises an outer ring, an inner ring and a plurality of honeycomb shaped slots disposed between said outer ring and inner ring.

\* \* \* \* \*